March 11, 1958 C. E. KORN 2,826,232
ANTI-SKID AND TRACTION DEVICE FOR VEHICLES
Filed June 22, 1956 2 Sheets-Sheet 2
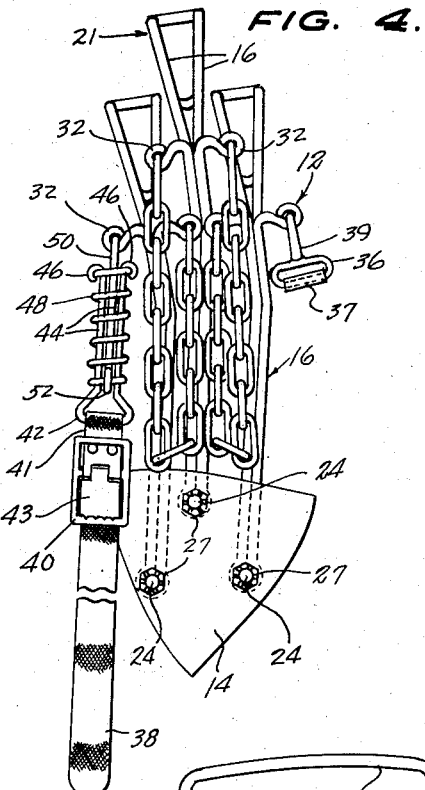
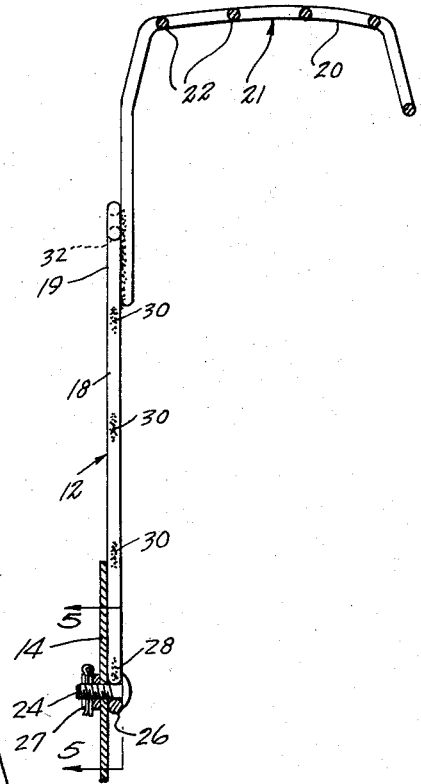
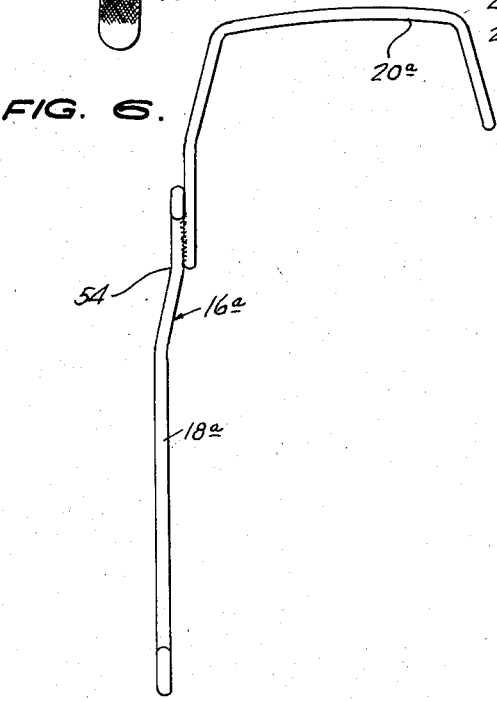
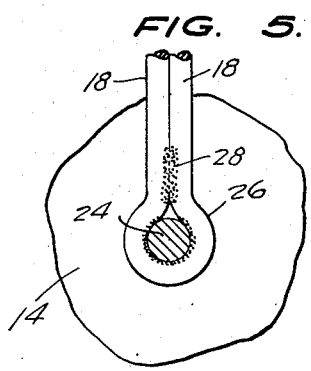
INVENTOR.
CHARLES E. KORN,
BY
McMorrow, Berman + Davidson
ATTORNEYS.

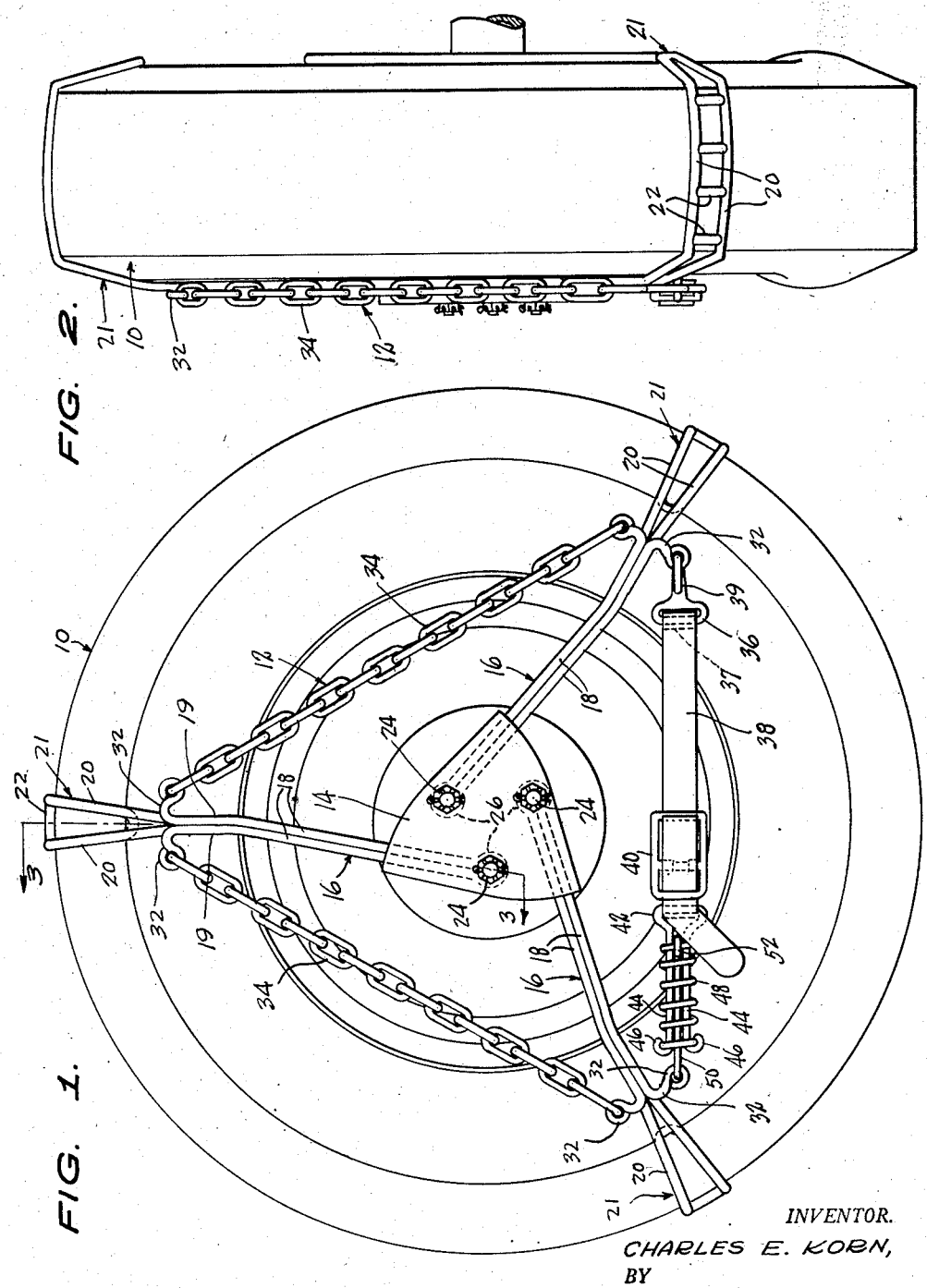

United States Patent Office 2,826,232
Patented Mar. 11, 1958

2,826,232

ANTI-SKID AND TRACTION DEVICE FOR VEHICLES

Charles E. Korn, Peru, Ill.

Application June 22, 1956, Serial No. 593,274

2 Claims. (Cl. 152—217)

This invention relates to an anti-skid and traction device for use on automobile and truck wheels. Summarized briefly, the invention comprises a center plate, adapted to be disposed over the hub portion of the associated wheel. Pivotally connected at their inner ends to said plate at locations spaced triangularly upon the plate are elongated hooks, the outer, free ends of which are adapted to straddle the wheel to provide anti-skid and traction means thereon. Connected to the intermediate portions of said hooks are flexible connecting elements, one of which is adjustable as to length, and is resiliently expandable and contractable, so as to take up slack in the remaining connecting elements. Said connecting elements are disposed in a triangular arrangement, and on opening of the adjustable element, the entire device can be readily removed from the wheel and folded.

Most anti-skid and traction devices are relatively inconvenient so far as the installation thereof is concerned. For example, many of these devices require that the vehicle be moved or jacked up, this being required both during installation and removal of the device. Further, it is often necessary that one make connections at the inner side of the wheel, which is difficult and decidedly inconvenient.

Still further, devices of this type presently in use require, in most instances, the use of levers, wrenches, tire irons or equivalent tools and special applying means.

A further difficulty and inconvenience noted in connection with the conventional anti-skid devices resides in the fact that said devices often tend to become somewhat loose, as a result of which there is considerable rattling of the device against fenders, "creeping" of the device about the wheel, and a loss of balance of the device upon the wheel.

The main object of the present invention is to provide an anti-skid and traction device, usable in mud, snow, or ice, which will have none of the above noted deficiencies found in anti-skid chains or like devices generally in use today.

Further objects of importance are as follows:

To provide an anti-skid device that will be simply designed, will have few parts, and will have a particularly efficient mode of operation;

To provide a device as described that will be swiftly collapsible, and will fold fan-fashion into a relatively small, compact article, thus facilitating storage thereof in a small space;

To provide for installation and removal with maximum ease and speed;

To insure that the device will remain securely fastened to the wheel, regardless of the speed of operation of the vehicle;

To provide a device as described which will be self-adjusting when used on worn tire treads;

To so design the anti-skid device as to insure that it will comply with highway regulations; and To provide a self-adjusting characteristic in the device, causing the same to eliminate the slack usually occurring by reason of the flattening of a vehicle tire at the bottom thereof.

Other objects will appear from the following description, the claims appended thereto, and from the annexed drawing in which like reference characters designate like parts throughout the several views and wherein:

Figure 1 is an elevational view of an anti-skid device formed according to the present invention, as it appears when applied to a vehicle wheel;

Figure 2 is an elevational view of said device and the wheel as seen from the right of Figure 1;

Figure 3 is an enlarged sectional view on line 3—3 of Figure 1;

Figure 4 is an elevational view of the device folded for storage;

Figure 5 is an enlarged detail section on line 5—5 of Figure 3, showing the connection of one of the hooks to the center plate; and Figure 6 is an elevational view of a modified form of wheel-engaging hook.

Generally designated at 10 is an automobile wheel, to which has been applied the anti-skid and traction device generally designated 12 constituting the present invention.

My device includes an approximately triangular, flat, center hub plate 14, to which are connected three elongated arms generally designated at 16 and formed identically to one another from stout, rigid rod material.

Each arm 16 has straight inner end portions, and to provide said inner end portions, the ends 18 of the rod used in forming the arm are extended in longitudinally contacting relation, merging into longitudinally contacting arm portions 19 securely welded together over their full lengths. Portions 19 at their outer ends are integral with laterally, oppositely projecting extensions terminating in closed eyes or loops 32.

The portions 19 overlie and are securely welded to shoes or hooks generally designated at 21, each formed to include side elements 20, extending in diverging relation from the outer end of the shoe and bent into a hook shape to straddle the tire. The side portions or elements 20 are laterally spaced from one another, in substantially parallel relation, where they cross the tread of the tire, as best shown in Figure 2. At the outer side of the tire, said portions extend in converging relation to, and are securely welded to, the longitudinally contacting portions 19 of the arm. The parallel, tread-crossing members are joined, at uniformly spaced intervals over the width of the tread, by short connecting pieces 22, welded to said members.

The free ends of the shoes are extended radially a substantial distance along the inner side walls of the tire, to prevent slippage in the event of faulty installation.

This provides, on the outer end of each arm, a cleat-like means 21 secured to said outer end and overlying the tire tread, which means is of grill-like formation, including the parallel members and the connecting pieces 22. This construction has been found to be particularly effective in increasing traction, both in mud and snow, and has been further found in practice to effectively prevent skidding.

The construction has the highly desirable characteristic, further, of permitting the arms to be manufactured in a single size usable on all wheel sizes, since the shoes may be overlapped with the arm portions 19 in selected positions of relative longitudinal adjustment and welded in said selected positions.

Further, the manufacturing cost is reduced in that mild steel may be used for the arms, and spring carbon steel only on the shoes.

To provide for the pivotal connection of the arms 16 to the center hub plate, short bolts 24 are employed, These, as shown in Figure 5, extend through eyes 26 formed at the inner ends of the several arms, said eyes being defined by loops formed out of the mid-length portions of the rods used in forming the arms.

The bolts 24 are welded in the eyes of the arms, and extend through smooth-walled openings formed inwardly from the periphery of the center hub plate 14, said openings being triangularly spaced upon the hub plate. The arms pivot about axes normal to the plane of the hub plate, and are disposed in contact with the inner face thereof.

Threaded on the bolts 24 are hex castle nuts 27, and cotter pins are extended through the nuts and their associated bolts, to secure the connection.

As noted in Figure 5, a weld 28 is provided at the inner end of each arm, adjacent the eye thereof, said weld fixedly joining the longitudinally contacting portions 18. Additional welds 30 (see Figure 3) are employed to provide a fixed connection between said portions 18, the welds 30 being spaced uniformly along the length of the portions 18.

Connected between selected eyes 32 of the several arms are two chains 34.

The chains 34 provide connector elements between adjacent arms, for the purpose of maintaining shoes or hooks 21 in position upon the wheel, and it may be noted that the eyes 32 are not welded shut, thus facilitating the replacement of the chains 34 whenever necessary. By reference to Figures 1 and 2, it will be seen that the eyes 32 are disposed at the bulge of the tire, and the arrangement serves to hold the chains and the portions of the device circumscribed by the chain means out of contact with the tire and with the hub cap of the wheel.

Cooperating with the chains 34 is a third connector or spreading member, including a spring-tongued connector loop 36 of oblong shape, having roller sleeve 37 about which is extended a webbing strap 38. A closed eye 39 is welded at right angles to loop 36, and receives the adjacent eye 32. Strap 38 at one end is connected to a buckle 40. Any of various designs of buckles may conceivably be employed in a commercial embodiment, but it is preferred that the buckle be of the type including a stirrup 41 of webbing material riveted at its ends to provide a closed loop thereon receiving the widened, looplike adjacent end of a U-shaped connector member 42. Further, the buckle includes a flat tongue 43 toothed at its free end and pivoted on the cross bar of the buckle, for engagement in the material of the strap 38. The connector member 42 constitutes one component of a spring tension assembly, said connector member being provided with straight, laterally spaced end portions 44 terminating at their free ends in oppositely, outwardly curved hook elements 46. A compression coil spring 48 abuts at one end against the hook elements, and extending through the spring with the connector member 42 is a second connector member 50 formed identically but oppositely to the member 42. Member 50 is provided at the outer ends of the legs thereof with outwardly turned hooks 52 engaging in the opposite end of the spring. The bight portion of member 50 is engaged in the adjacent eye 32 of one of the arms 16 as shown in Figure 1.

Referring to Figure 6, there is shown a modified form of arm generally designated 16a, having an inner end portion 18a of straight formation. Welded to the outer end of the arm is a shoe 20a.

The modified construction differs from the first form through the provision of an offset 54. The purpose of the offset is to dispose the inner end portion 18a laterally, outwardly from the tire-embracing hook element 20a a greater distance than the portion 18 is disposed outwardly from its associated hook member 20. This will be desirable if the hub cap of the vehicle protrudes outwardly beyond the vertical plane of the outer side wheel of the tire. This form of the invention permits bending of the arm, at any time, when fitting the same to a wheel.

In use of the device, it will initially appear as in Figure 4, collapsed fan-fashion with the webbing straps detached from the loop 36.

The shoes 21 are now applied to a tire-straddling position, either at the front or back portion of the tire, that is, either at the left or right hand part of the tire, viewing the same as in Figure 1.

The center hub plate is disposed toward the center of the wheel, and the uppermost arm is now shifted upwardly about the wheel. The other arms will follow, due to the connection of the chains therebetween.

The middle arm will stop at the top of the wheel and the center plate is now turned counter-clockwise in Figure 1. The arms shown at the left and at the right in Figure 1 are now pushed downwardly until the chains 34 are drawn taut.

The webbing strap is now inserted in the loop 36 and then engaged in the buckle, and the strap is then drawn up until the compression spring 48 is completely closed. The free end of the strap 38 is now secured in the keeper of the buckle. The excess at said free end of the strap may now be wrapped about the buckle and tucked between the strands of the strap to avoid slapping against the fender. Any surplus strap material may be cut off if desired, when the proper length is ascertained for the particular size on which the device is used.

Removal of the device is accomplished merely by reversing the order of installation, and can be effected at any position in which the wheel stops, except of course when one of the shoes is under the tire. It will be apparent that the device requires no tools or levers, during installation or removal, and is applied as well as removed without moving the vehicle or otherwise causing the tire to rotate.

The tension of the spring 48 is quite ample for the purpose of taking up all slack, since the device adjusts itself when in use. This is especially true of the upward "give" or slack resulting due to passage of a shoe under the tire, where the tire is always flattened at the bottom thereof.

Other important advantages of the device may be readily noted. Not only is it easy to install and to remove, but further, rattling of the device, or creeping around the tire is fully prevented due to its being under heavy spring tension when installed. The device will not fly off the wheel at any speed, as distinguished from the conventional anti-skid devices, which cannot be used at relatively high operational speeds.

The cross bars 22 in the tread-overlying shoe of each arm prevent lateral slippage of the wheels, with the portions 20 providing full traction in forward and reverse movements of the wheel.

Still further, when the device is removed, it folds up fan-fashion as shown in Figure 4 so as to be capable of storage in a relatively small area.

Another important characteristic of the invention resides in the fact that it is always maintained upon the wheel in a proper state of balance, thus further aiding in efficient operation and preventing the occurrence of excessive strains at any given location upon the device.

It is believed apparent that the invention is not necessarily confined to the specific use or uses thereof described above since it may be utilized for any purpose to which it may be suited. Nor is the invention to be necessarily limited to the specific construction illustrated and described, since such construction is only intended to be illustrative of the principles in construction that may be permitted within the scope of the appended claims.

What is claimed is:

1. An anti-skid and traction device for a vehicle wheel comprising a substantially flat center plate; a plurality of arms having generally straight inner end portions pivotally attached to said plate and hook-shaped shoes on their outer end portions adapted to straddle a vehicle wheel, said arms swinging on the plate about axes normal to the plane of the plate between inoperative and operative positions, the arms in their inoperative positions being extended from the plate in a common direction in side-by-side relation, and in their operative positions extending from the plate angularly to one another at locations spaced about the periphery of the plate; and flexible elements connected between the arms, said elements being connected to the arms substantially at the juncture of the shoes with the outer end portions of the respective arms, one of said elements including strap means connectable to one of the arms and adapted for adjustment as to its overall length, a first connector member connected to the strap means, a second connector member connected to a second one of the arms, said first and second connector members extending in overlapping relation, and a compression spring receiving the overlapping portions of the first and second connector members and engaged at its ends by said first and second connector members, whereby to place said spring under tension responsive to drawing up the strap means.

2. An anti-skid and traction device for a vehicle wheel comprising a substantially flat center plate; a plurality of arms having generally straight inner end portions pivotally attached to said plate and hook-shaped shoes on their outer end portions adapted to straddle a vehicle wheel, said arms swinging on the plate about axes normal to the plane of the plate between inoperative and operative positions, the arms in their inoperative positions being extended from the plate in a common direction in side-by-side relation, and in their operative positions extending from the plate angularly to one another at locations spaced about the periphery of the plate; and flexible elements connected between the arms, said elements being connected to the arms substantially at the juncture of the shoes with the outer end portions of the respective arms, one of said elements including strap means connectable to one of the arms and adapted for adjustment as to its overall length, a first connector member connected to the strap means, a second connector member connected to a second one of the arms, said first and second connector members extending in overlapping relation, and a compression spring receiving the overlapping portions of the first and second connector members and engaged at its ends by said first and second connector members, whereby to place said spring under tension responsive to drawing up the strap means, the remaining flexible elements each being free to contract in a longitudinal direction while being limited against extension beyond a predetermined length.

References Cited in the file of this patent
UNITED STATES PATENTS

| | | |
|---|---|---|
| 411,343 | Leckron | Sept. 17, 1889 |
| 884,829 | Lewis | Apr. 14, 1908 |
| 2,093,404 | Akins | Sept. 21, 1937 |
| 2,559,425 | Haracz | July 3, 1952 |
| 2,586,049 | Jacobs | Feb. 19, 1952 |
| 2,696,237 | Doughty | Dec. 7, 1954 |